United States Patent
Facius et al.

(10) Patent No.: US 8,212,198 B2
(45) Date of Patent: Jul. 3, 2012

(54) LASER PROJECTION DEVICE HAVING A DIFFUSER ARRANGED IN AN IMAGE FOCAL PLANE AND AN OBJECT FOCAL PLANE AND METHOD FOR MANUFACTURING A LASER PROJECTION DEVICE

(75) Inventors: Zoltan Facius, Kernen (DE); Marco Hering, Stuttgart (DE); Markus Kamm, Karlsruhe (DE); Manfred Manz, Ostfildern (DE)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 12/630,136

(22) Filed: Dec. 3, 2009

(65) Prior Publication Data

US 2010/0171932 A1  Jul. 8, 2010

(30) Foreign Application Priority Data

Dec. 5, 2008 (EP) ..................................... 08021212

(51) Int. Cl.
*H01L 27/00* (2006.01)
(52) U.S. Cl. ...................................... 250/208.1; 353/76
(58) Field of Classification Search ............... 250/208.1, 250/239, 216; 353/76, 101, 102; 359/458–478; 349/15
See application file for complete search history.

(56) References Cited

U.S. PATENT DOCUMENTS

| 4,035,068 | A | 7/1977 | Rawson |
| 4,453,806 | A | 6/1984 | Wick |
| 6,154,259 | A | 11/2000 | Hargis et al. |
| 6,185,016 | B1 | 2/2001 | Popovich |
| 7,046,446 | B1 | 5/2006 | Kowarz et al. |
| 7,391,574 | B2 | 6/2008 | Fredriksson |
| 7,425,070 | B2 * | 9/2008 | Hsu .................................. 353/7 |
| 2004/0008392 | A1 | 1/2004 | Kappel et al. |
| 2004/0008399 | A1 | 1/2004 | Trisnadi |
| 2007/0171376 | A1 | 7/2007 | Wang et al. |

FOREIGN PATENT DOCUMENTS

WO  WO 95/10159  4/1995

OTHER PUBLICATIONS

Jahja I. Trisnadi, "Speckle contrast reduction in laser projection displays", Silicon Light Machines, 7 pages.
European Office Action issued Jan. 4, 2011, in Patent Application No. 08021212.9.

* cited by examiner

*Primary Examiner* — Que T Le
(74) *Attorney, Agent, or Firm* — Oblon, Spivak, McClelland, Maier & Neustadt, L.L.P.

(57) ABSTRACT

Laser projection device comprising an image generating unit, intermediate imaging optics configured to generate an intermediate image at an image focal plane (210), an image diffusing element (300) and a projection lens (400) with an object focal plane (410), wherein the image diffusing element (300) is arranged in the image focal plane (210) and in the object focal plane (410) and comprises a superimposed microstructure (310) formed of constituent parts (311), which are regularly distributed within a surface plane (320) of the image diffusing element (300).

28 Claims, 10 Drawing Sheets

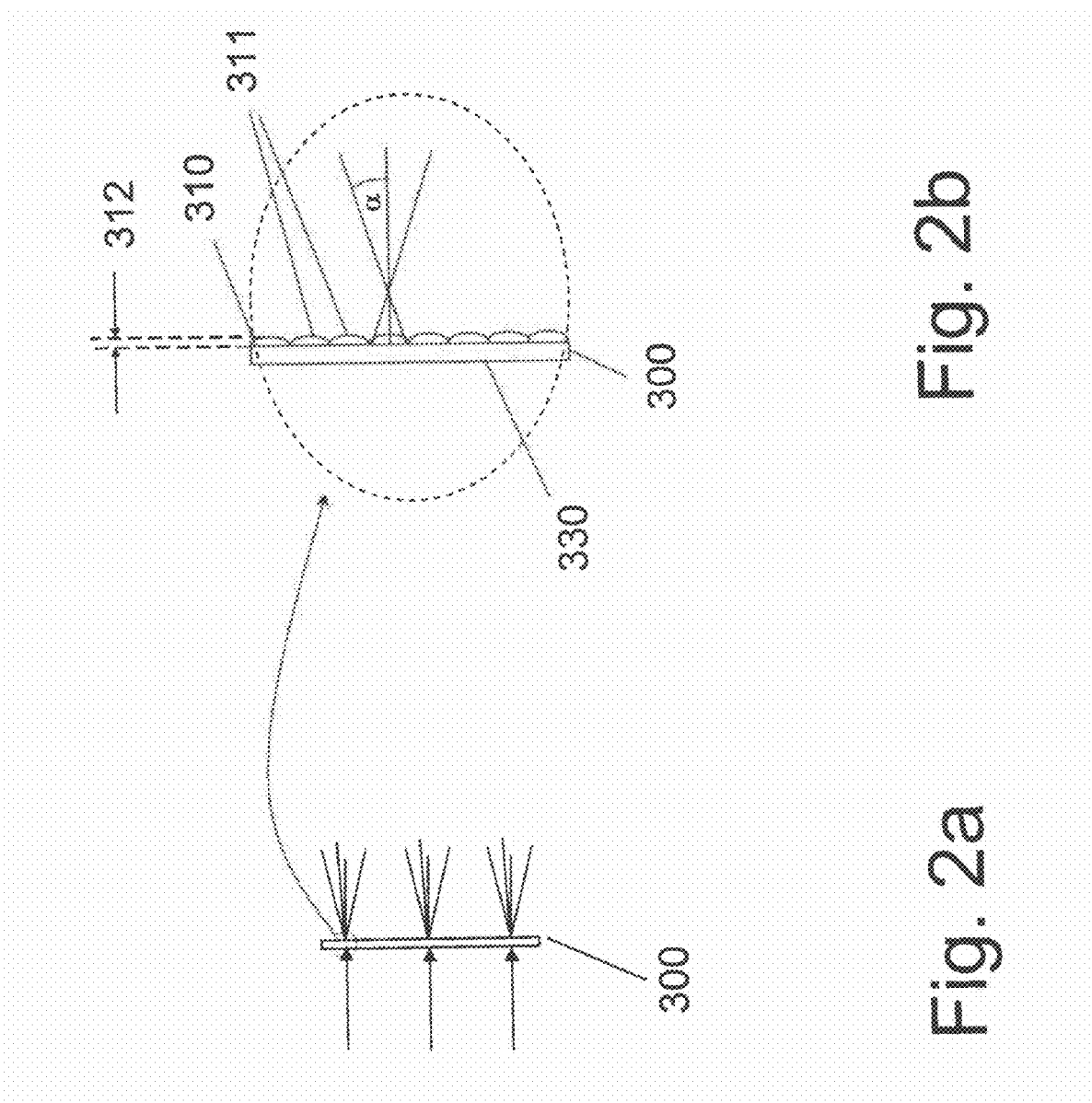

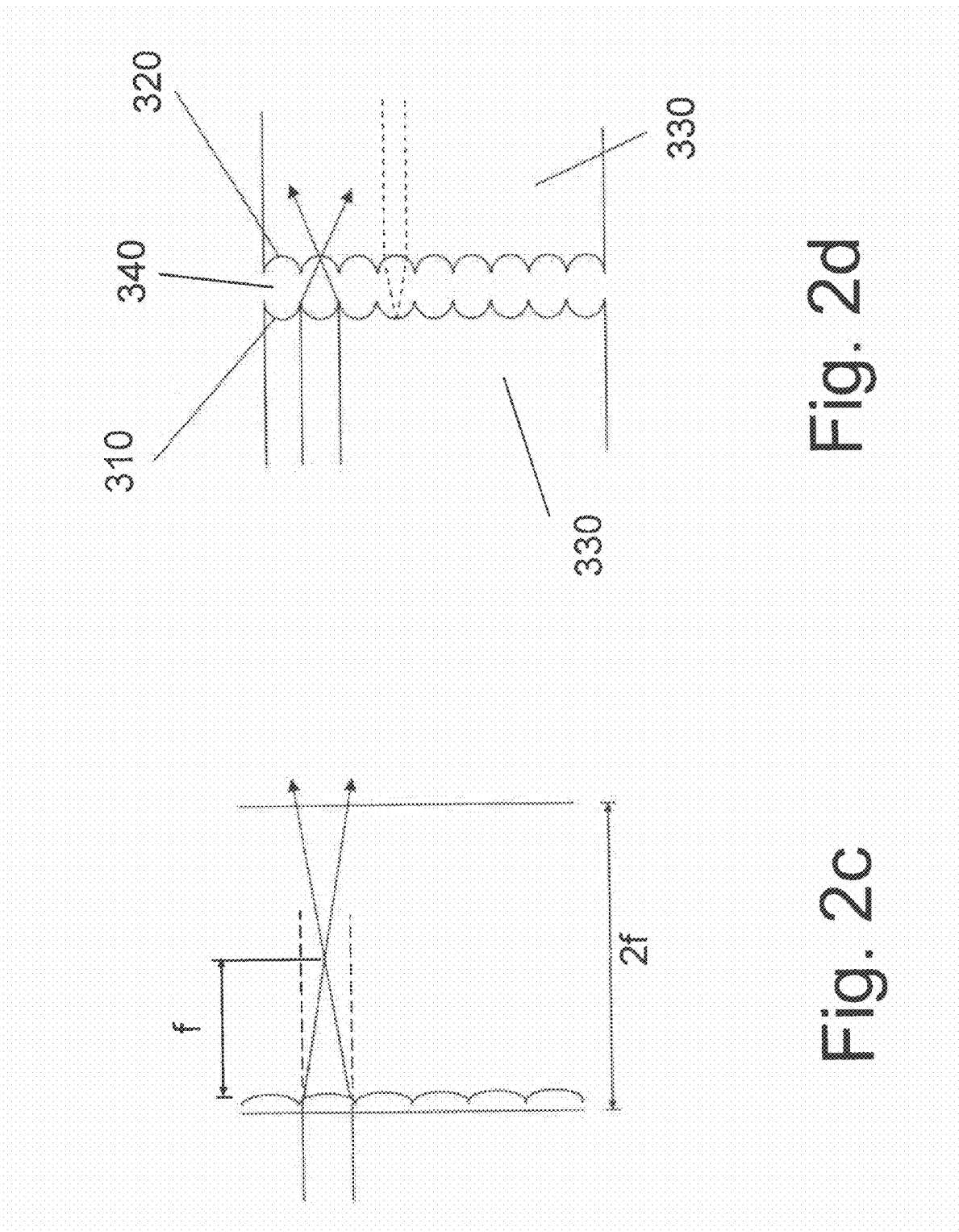

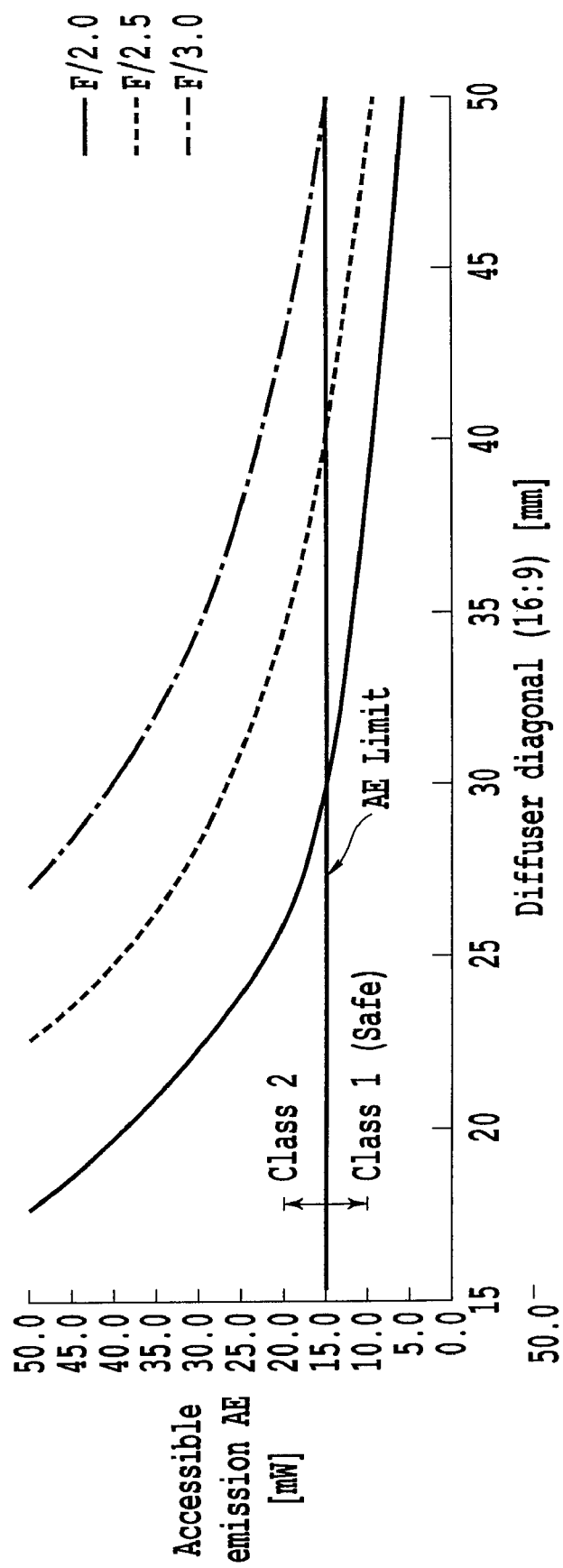

LASER PROJECTION DEVICE HAVING A DIFFUSER ARRANGED IN AN IMAGE FOCAL PLANE AND AN OBJECT FOCAL PLANE AND METHOD FOR MANUFACTURING A LASER PROJECTION DEVICE

An embodiment of the invention relates to a laser projection device. A further embodiment relates to a method for manufacturing a laser projection device.

BACKGROUND

There are two major goals in the design of projectors: On the one hand size and costs of the components are to be reduced and on the other hand the lumen output should be increase. Therefore, light sources in projectors emit light with extremely high luminance. This allows the use of small image generators and the design of small projection optics. As a consequence the exit pupil of the projection lens is small and emits light with high luminance, which can be hazardous to the eye when staring into the projection lens.

Lasers could be considered to be ideal light sources for projectors as they act almost like a point source and therefore aim at light with extremely high luminance. However, projectors which use laser light sources must be classified according to laser safety standard IEC60825-1, and with state of the art optical architectures it is impossible to realize a projector which both has sufficient lumen output (e.g. output of 1000 lumen) and as well fulfills laser safety class 1 conditions. As a consequence, laser projectors are not common in everyday's use so far.

BRIEF SUMMARY

Therefore, it is an object of the present invention to provide a laser projection device that fulfills conditions of laser safety class 1.

This object is solved by a laser projection device according to claim 1 and a method for manufacturing a laser projection device according to claim 12.

Further embodiments are defined in the dependent claims. Further details of the invention will become apparent from a consideration of the drawings and ensuing description.

BRIEF DESCRIPTION OF THE DRAWINGS

The accompanying drawings are included to provide a further understanding of embodiments and are incorporated in and constitute part of this specification. The drawings illustrate embodiments and together with the description serve to explain principles of the embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIGS. 2a and 2b show the cross-section of a diffuser in two different scales.

FIG. 2c also shows a cross-section of the diffuser.

FIG. 2d shows a cross-section of the diffuser with a double microstructure according to a further embodiment of the invention.

FIG. 4a shows the accessible emission (AE) depending on the size of the diffuser for different F-numbers F/#.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

Figure 1:
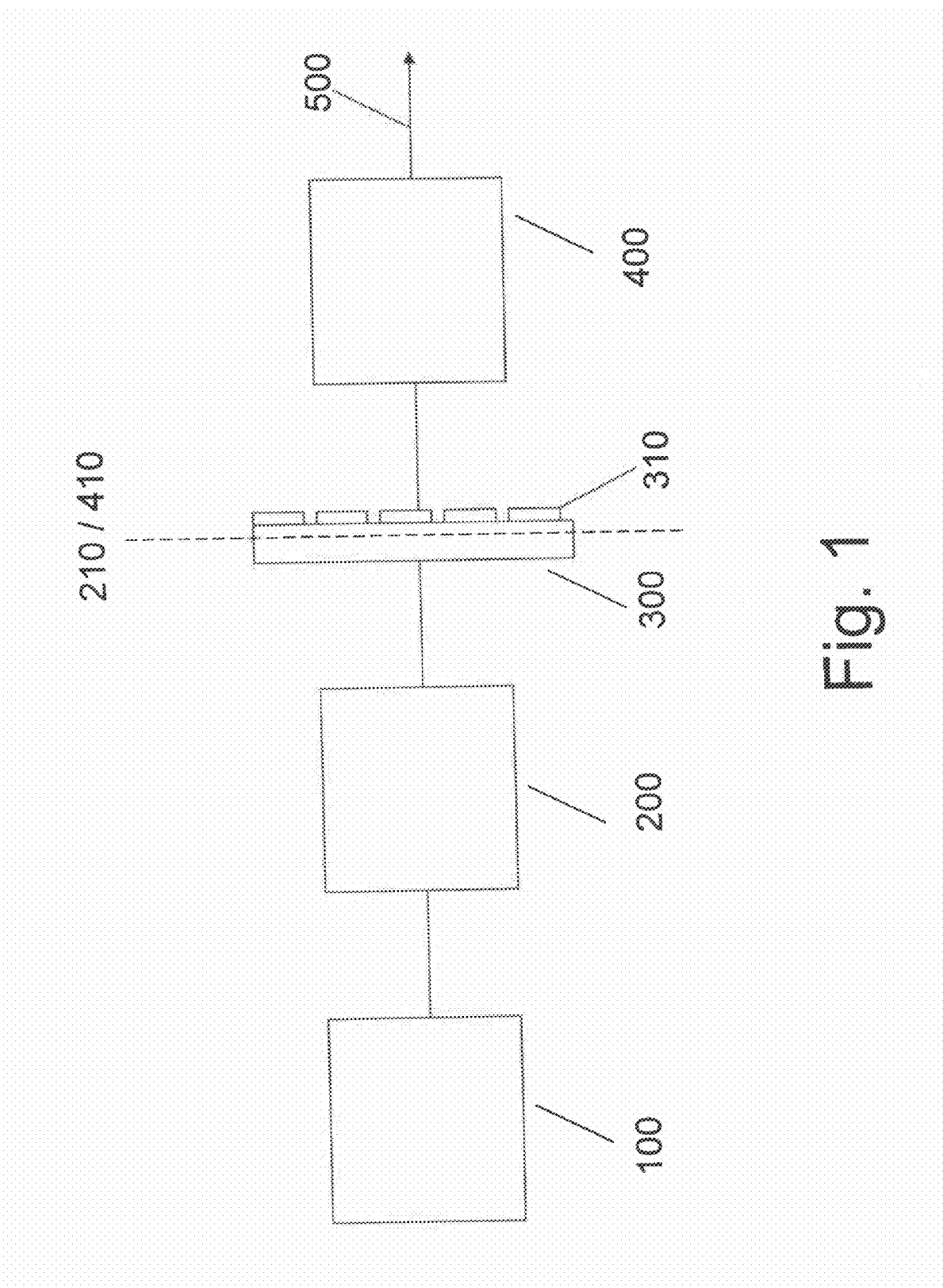
FIG. 1 shows schematically a laser projection device according to an embodiment of the invention.

FIG. 1 shows an image generating unit 100, intermediate imaging optics 200, a diffuser 300 and a projection lens 400, arranged along an optical axis 500.

The image generating unit 100 may include a micro display generating a small image, with a typical size below 2.54 cm (which corresponds to 1 inch) diagonal. The image generating unit may include a transmissive or reflective liquid crystal display (LCD) or a micro-electro-mechanical system (MEMS).

Typical micro-displays in projectors of the 1000 to 2000 lm class have diagonals between 1.27 and 2.03 cm (which corresponds to 0.5 to 0.8 inch). Projectors with such small micro-displays and 1000 lm or more output would not fulfill laser safety class 1.

The image generating unit 100 may further include a laser light illumination optics, e.g. including a laser light source and e.g. further lenses.

The image generated by the micro-display is projected by means of an intermediate imaging optics 200 to an image at the position of the diffuser 300.

The intermediate imaging optics 200 may comprise a conventional imaging lens optics, which generates a magnified image of the small image at the position of the diffuser 300. This may be realized by a lens system with two conjugate focal planes. The first focal plane, which is the object plane of the intermediate imaging optics 200, is located at the position of the display panel. The second focal plane, which is the image focal plane of the intermediate imaging optics 200, is located at the position of the diffuser 300. The lens system is adapted in order to generate a magnified image of the image from the first focal plane onto the second focal plane.

In other words: The diffuser 300 is located at the position of the focal image plane of the intermediate imaging optics 200, so that a real image appears at the diffuser 300.

The lens system is preferably telecentric and both the laser light illumination optics and the intermediate imaging optics 200 are optically designed for a high F-number. This ensures high image contrast and allows smaller and simpler optical components.

Optionally the lens system of the intermediate imaging optics 200 may be designed to have a zoom function with variable magnification factor, which generates an intermediate image of adjustable size. It is preferred to integrate the zoom function into the intermediate imaging optics 200 rather than having the zoom function integrated into the projection lens 400, which is expected to be more expensive.

The diffuser 300 receives light from the intermediate imaging optics 200 and generates a projection light beam with increased angular spread, thereby reducing the F-number.

The diffuser 300 comprises a transparent substrate 330 of glass or plastic and a microstructure layer 310 on at least one side of the substrate 330, as also shown in FIG. 2b.

The microstructure layer 310 should be adapted in order to distribute the incoming light beam uniformly into an enlarged cone angle, thereby having a reduced F-number at the exit of the diffuser 300. The microstructure layer 310 is formed of constituent parts 311 e.g. regularly distributed thereby forming a microstructure pattern. This pattern might have a shape in which there are no free spaces between the constituent parts 311 in order to achieve a better distribution and fill factor.

The diffuser 300 is located in the image focal plane 210 of the intermediate imaging optics 200. The depth 312 of the constituent parts 311 should be small compared to the depth of focus of the intermediate imaging optics 200, since otherwise the real image, which is generated by the intermediate imaging optics 200 at the image focal plane 210 of the intermediate imaging optics 200, would become blurred.

In other words, the incoming light is spread by means of the microstructure layer 310 into a wider cone angle, thereby reducing the F-number. The size of the constituent parts 311 of the microstructure layer 310 should be smaller than a magnified pixel size of the micro display 120, wherein a magnification factor of the magnified pixel size is determined by the magnification of the intermediate imaging optics 300, in order to reduce the F-number on a pixel level.

The microstructure layer 310 may comprise micro-lenses as constituent parts 311 with a squared or hexagonal shape or it may comprise any random or periodic surface contour which spreads the light by means of refraction. Alternatively, it may comprise a shape or micro-pattern, which spreads light by means of diffraction.

The surface of the microstructure layer 310 is located in the image focal plane 210 of the intermediate imaging optics 200 and the object focal plane 410 of the projection lens 400.

Moreover, the depth 312 of the constituent parts 311 of the microstructure layer 310 should be smaller than both the depth of focus of the intermediate imaging optics 200 and the depth of focus of the projection lens 400 at the position of the intermediate plane, wherein the depth of focus is a measurement of depth of acceptable sharpness. The depth of focus might also be referred to as focus region.

In case of a microstructure layer 310 with convex lenses as constituent parts 311, having a certain focal length f, it is sufficient if a tunnel of length 2f is within the focus region of the projection lens 400, as shown in FIG. 2c.

In any case the microstructure layer 310 needs to be located within the focus region of the intermediate imaging optics 200.

The size of the intermediate image and the F-number at the exit of the diffuser 300 is adjusted in order to fulfill laser safety class 1, 2, 3r or 3b condition of standard IEC60825-1.

Figure 7:
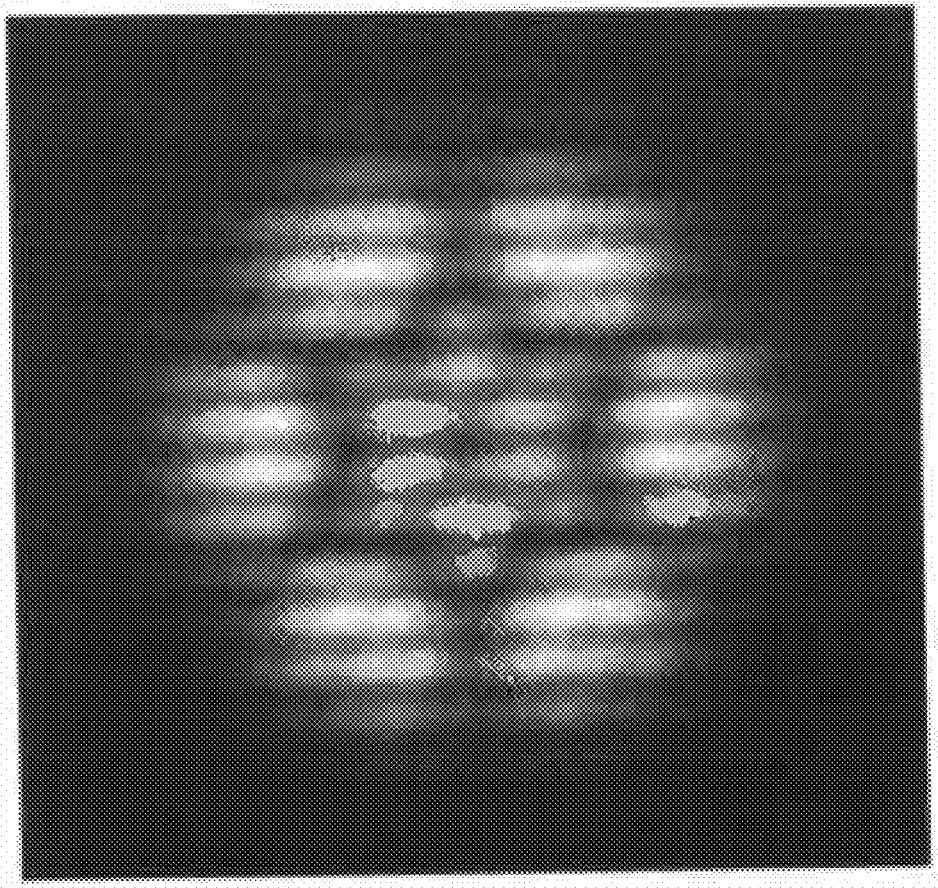
FIG. 7 shows an interference pattern.

In one further embodiment of the diffuser 300 there is a second microstructure layer 320 built on the opposite side of the substrate 330, as also illustrated by FIG. 2d: Since the diffuser 300 with only a single microstructure layer 310 may generate an interference pattern when illuminated by coherent light, as illustrated in FIG. 7, this embodiment with a second microstructure layer 320 will suppress the interference pattern. The second microstructure layer 320 is formed of constituent parts 321 with a distance between the two microstructure layers (310, 320) being small—typically 50 μm to 100 μm. The second microstructure layer 320 is placed in the focal plane of the constituent parts 311, e.g. microlenses, of the first microstructure layer 310.

Since it is difficult to manufacture these microstructure layers (310, 320) on both sides of a substrate 330, it is suggested to combine two substrates with the microstructure layers being positioned on opposite sides and fill the gap 340 between adjacent sides of the substrates by a resin with high refractive index (n=1.6 to 1.7 when the substrate has n-1.45 to 1.50). The gap 340 is adapted to match the focal length of the microstructure layer inside the resin.

The projection lens 400 shown in FIG. 1 projects the intermediate image to a screen and is optically designed for a low F-number in order to capture all light emitted from the diffuser 300.

The conventional projection lens 400 is adapted to the F-number of the light passing the diffuser 300. The depth of focus of the projection lens 400 should be large compared to the depth of the structure of the diffuser 300.

The cross-section of the diffuser 300 is shown in FIGS. 2a and 2b illustrating the function of the diffuser 300: Collimated light with high F-number (corresponding to a low angular divergence) is spread by means of a microstructure layer 310 (only shown in FIGS. 2b and 2c, which have a larger scale) into a beam of lower F-number, which corresponds to high angular divergence.

The further preferred embodiment of the diffuser 300 already explained above is shown in FIG. 2c: Since the diffuser 300 with only a single microstructure layer 310 may generate an interference pattern when illuminated by coherent light (as illustrated in FIG. 7) the diffuser 300 comprises a second microstructure layer 320.

Figure 3:
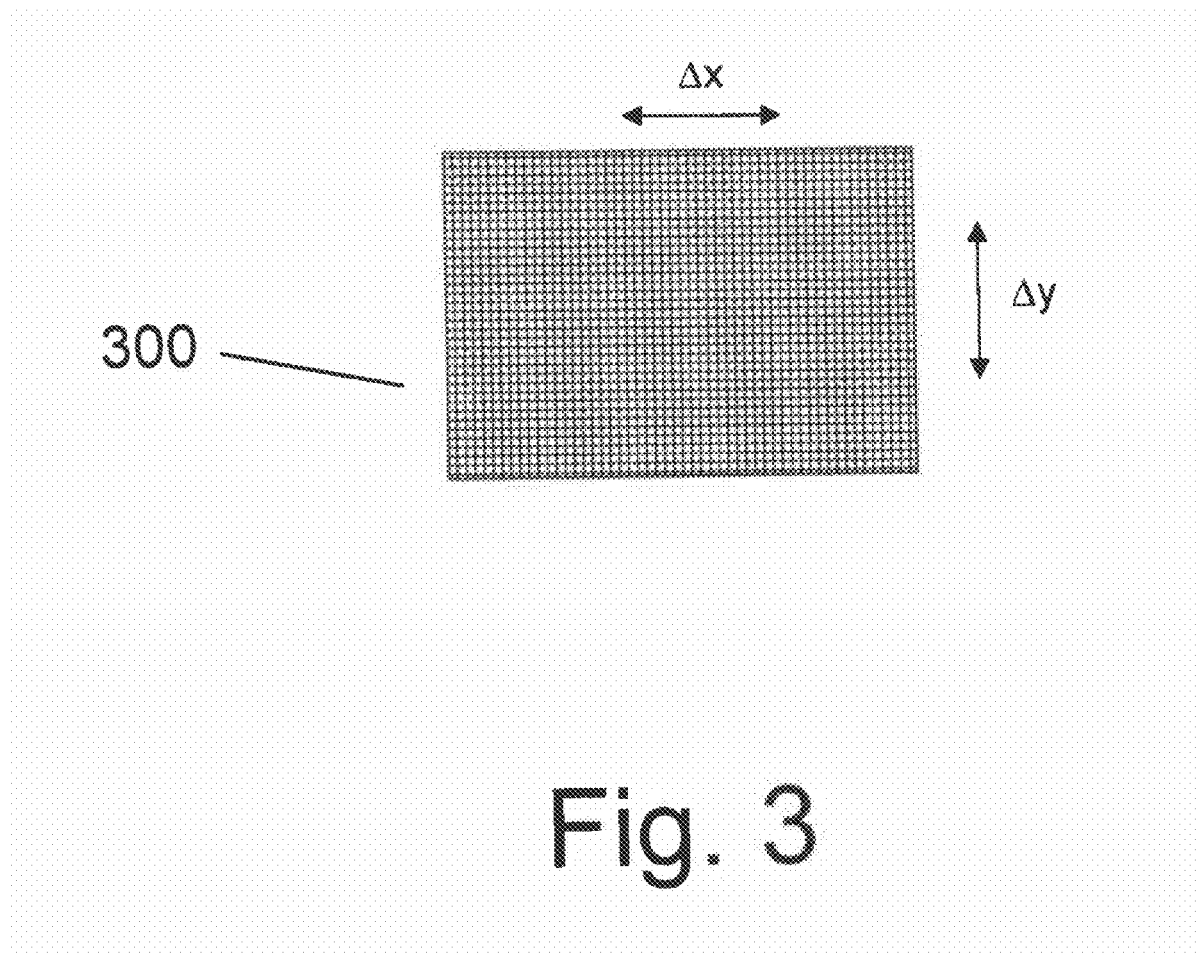
FIG. 3 shows the x-y plane of a diffuser perpendicular to the optical axis shown in FIG. 1.

Since it may be a further advantage to move (e.g. shake) the diffuser 300 in a plane parallel to the plane of the microstructure layer, which is perpendicular to the optical axis 500, in order to smooth out the visibility of the pattern of the microstructure and to avoid Moiré pattern, FIG. 3 shows the movement of the diffuser 300 in a plane perpendicular to the optical axis 400.

FIG. 4a shows the accessible emission (AE) of radiation according to laser safety standard IEC60825-1, which is set for giving a standard for classifying the value of radiation which is accessible to the human eye into different safety classes. Radiation of class 1 is being considered as safe, whereas radiation of class 2 is safe only if viewed less than 0.25 s into the beam. The example is illustrated for a distance of 100 mm from the exit pupil of the projection lens 400 for a projection system with 1000 lm output, where the projection lens 400 is designed to project an image of 152.4 cm (corresponding to 60 inch) size at 2 m distance. The three different graphs refer to different F-numbers.

Laser class 1 can be achieved if the F-number is small enough or the size of the intermediate image is sufficient large. In case of 2000 lm the accessible emission limit line would be below the accessible emission limit line of FIG. 4a for 1000 lm so that the diagonal of the intermediate image necessary for fulfilling laser safety class 1 would have to be larger for each F-number.

Specifically, the ratio between the intermediate image size $d_1$ and the F-number must exceed a certain limit in order to achieve laser class 1 conditions. This ratio is related to the pupil size $d_p$ of the projection lens according to following formula:

$$d_p = \frac{s' \cdot d_1}{d_s \cdot F/\#} \propto \frac{d_1}{F/\#}$$

where s' is the distance between the pupil and the screen and $d_s$ is the diameter of the image at the screen. In this particular example laser class 1 is achieved if the pupil size exceeds a diameter of approximately 20 mm.

In this example the light distribution inside the pupil is assumed to be uniform ("flat top" distribution as explained in FIG. 5 below). With non-uniform light distribution inside the pupil the limit of laser class 1 will be tighter. In that case a larger pupil size would be required for achieving laser class 1.

Figure 4B:
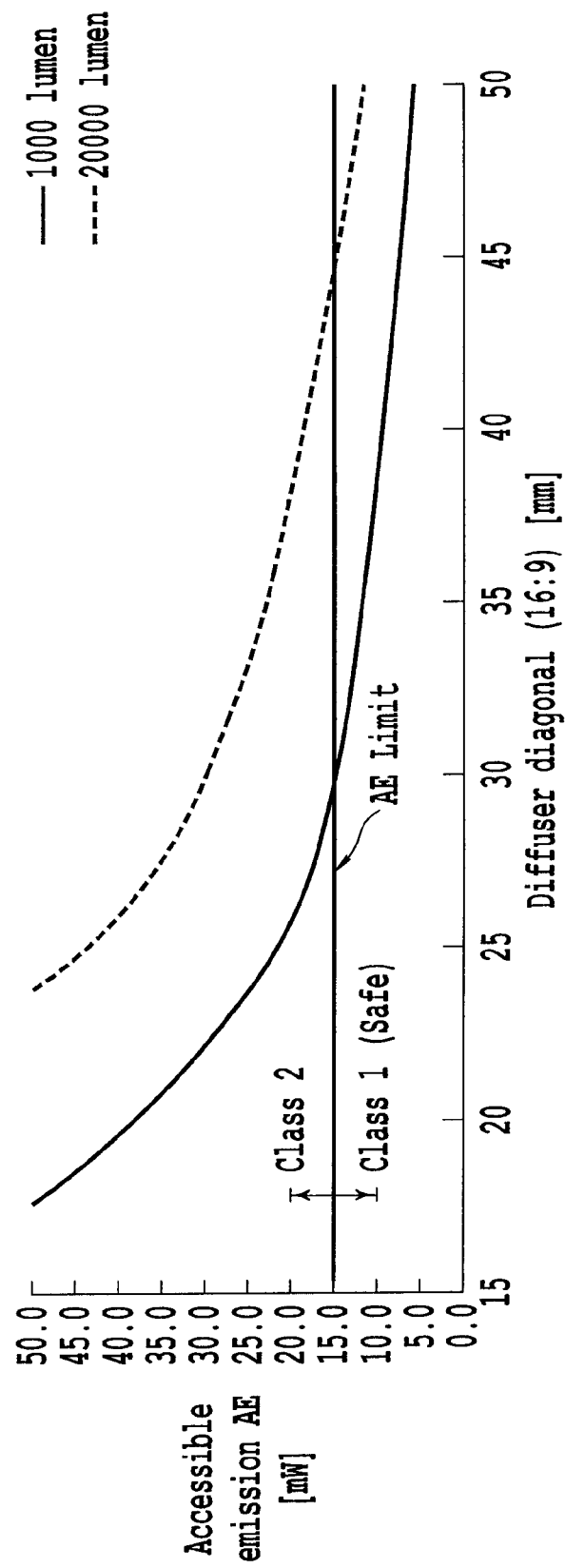
FIG. 4b shows the accessible emission depending on the size of the diffuser for the cases of 1000 lm and 2000 lm output.

FIG. 4b shows the accessible emission depending on the size of the diffuser 300 for cases of 1000 lm and 2000 lm output.

Figure 5:
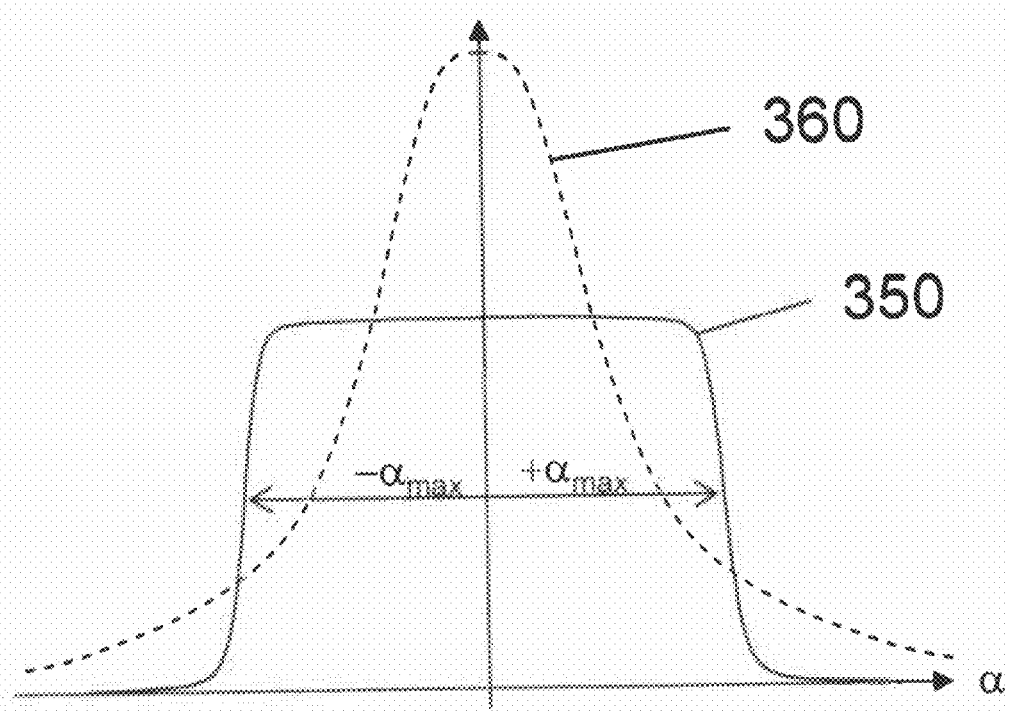
FIG. 5 shows the angular distribution of the light beam after passing the diffuser.

The diagram of FIG. 5 shows the angular distribution of the light beam after passing the diffuser 300, with $$F/\# = \frac{1}{2 \cdot \sin\alpha_{max}}$$

The distribution achieving a high laser safety is the uniform distribution 350, marked as a continuous line with a "flat top". Any other, non-uniform distribution 360 (like the dotted line) tends to be more hazardous to the eye.

Figure 6:
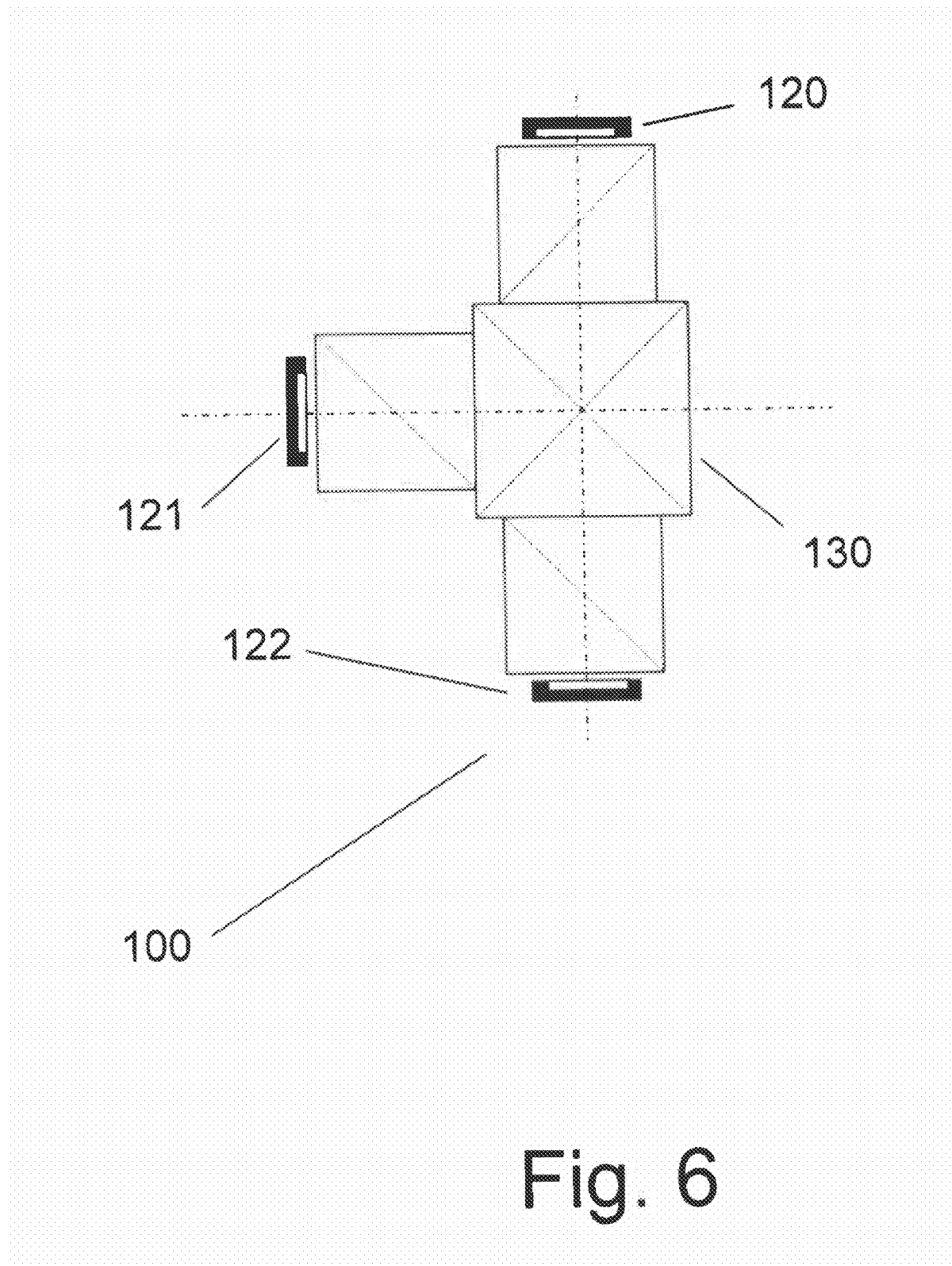
FIG. 6 shows an image generating unit using three micro displays and a recombination unit according to a further embodiment of the invention.

FIG. 6 shows an image generating unit 100 with three display panels 120, 121, 122 for generating three images— one in each of the primary colors red, green and blue. In case of three display panels the image generating unit 100 will comprise an additional recombination unit 130 for recombining light from the different images into a common light path. The display panels are illuminated by means of an illumination optics with high F-number. With high F-number the size of the components can be reduced and the image contrast can be improved.

FIG. 7 shows an interference pattern which may appear if the diffuser 300 with only a single microstructure layer 310 is illuminated by coherent light.

Figure 8:
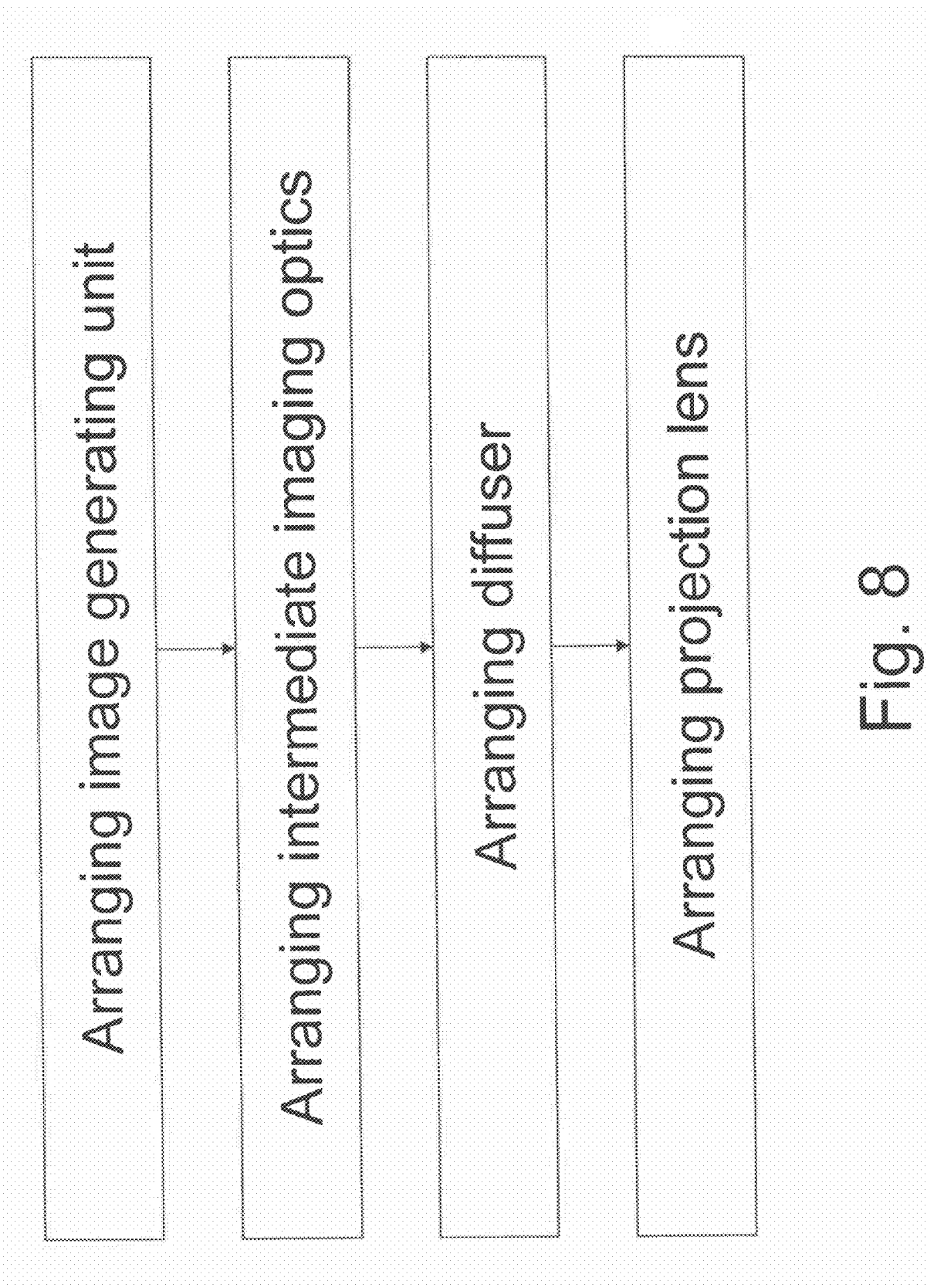
FIG. 8 shows schematically a method for manufacturing a laser projection device according to an embodiment of the invention.

FIG. 8 shows schematically a method for manufacturing a laser projection device with the following steps according to an embodiment of the invention:

Arranging an image generating unit (100) including a laser light illumination optics and a micro display (120)

arranging an intermediate imaging optics (200) configured to generate an intermediate image at an image focal plane (210)

arranging a diffuser (300) comprising a first microstructure layer (310) formed of constituent parts (311), which are regularly distributed within the first microstructure layer (310) and arranging a projection lens (400) with an object focal plane (410) in an arrangement wherein the diffuser (300) is located in the image focal plane (210) and in the object focal plane (410).

The invention claimed is:

1. Laser projection device comprising
an image generating unit including a laser light illumination optics and a micro display,
an intermediate imaging optics configured to generate an intermediate image at an image focal plane,
a diffuser and
a projection lens with an object focal plane,
wherein the diffuser is arranged in the image focal plane and in the object focal plane and comprises a first microstructure layer formed of constituent parts, which are distributed within the first microstructure layer,
wherein the laser light illumination optics and the intermediate imaging optics are optically designed for a higher F-number than an F-number of the projection lens.

2. Laser projection device according to claim 1, wherein the diffuser, is configured to increase the angular spread of the projection light beam, thereby reducing the F-number.

3. Laser projection device according to claim 1, wherein a depth of the constituent parts of the microstructure layer is smaller than both the depth of focus of the intermediate imaging optics and the depth of focus of the projection lens at the position of the intermediate plane.

4. Laser projection device according to claim 1, wherein the microstructure layer is adapted in order to distribute the incoming light beam uniformly into an enlarged cone angle.

5. Laser projection device according to claim 1, wherein a microstructure pattern formed by the constituent parts has a shape in which there are no free spaces between the constituent parts.

6. Laser projection device according to claim 1, wherein the microstructure layer may comprise micro-lenses as constituent parts with squared or hexagonal shape of the aperture.

7. Laser projection device according to claim 1, wherein the microstructure layer may comprise a random surface contour which spreads the light by means of refraction.

8. Laser projection device according to claim 1, wherein the microstructure layer may comprise a periodic surface contour which spreads the light by means of refraction.

9. Laser projection device according to claim 1, wherein the microstructure layer may comprise a shape or micropattern, which spreads light by means of diffraction.

10. Laser projection device according to claim 1, wherein the microstructure layer may comprise micro-lenses as constituent parts with convex curvature.

11. Laser projection device according to claim 1, wherein the size of the intermediate image and the F-number at the exit of the diffuser is adjusted in order to fulfill laser safety lass 1 condition.

12. Laser projection device according to claim 1, wherein the size of the intermediate image and the F-number at the exit of the diffuser is adjusted in order to fulfill laser safety lass 2 condition.

13. Laser projection device according to claim 1, wherein the size of the intermediate image and the F-number at the exit of the diffuser is adjusted in order to fulfill laser safety lass 3r or 3b condition.

14. Laser projection device according to claim 1, wherein the diffuser comprises a second microstructure layer formed of constituent parts.

15. Laser projection device according to claim 14, wherein the distance between the first and the second layer is equal to a focal length of the constituent parts.

16. Laser projection device according to claim 1, wherein the constituent parts are convex.

17. Laser projection device according to claim 1, wherein the constituent parts are shaped hexagonally within the microstructure layer.

18. Laser projection device according to claim 1, wherein the size of the constituent parts within the microstructure layer is smaller than a magnified pixel size of the micro display,
wherein a magnification factor of the magnified pixel size is determined by the magnification of the intermediate imaging optics.

19. Laser projection device according to claim 1, wherein the size of the constituent parts within the microstructure layer is less than 20 μm.

20. Laser projection device according to claim 1, wherein the depth of the constituent parts in a direction perpendicular to the microstructure layers is small compared to a depth of focus of the intermediate imaging optics.

21. Laser projection device according to claim 1, further comprising a moving unit configured to move the diffuser in a plane parallel to the microstructure layers.

22. Laser projection device according to claim 1, wherein the intermediate imaging optics is configured to have a zoom function with variable magnification factor integrated, which is adapted to generate an intermediate image of adjustable size.

23. Laser projection device according to claim 1, wherein the image generation unit comprises
one further micro display, wherein the further micro display is configured to generate time-sequentially an image in a first and a second color of three primary colors red, green and blue, and the first micro display generates an image in the third of the three primary colors, and
a recombination unit for recombining light from the two different images into a common light path.

24. Laser projection device according to claim 1, wherein the image generation unit comprises two further micro displays, wherein each of the three micro displays is configured to generate an image in one of the primary colors red, green and blue, and a recombination unit for recombining light from the three different images into a common light path.

25. Method for manufacturing a laser projection device comprising arranging
an image generating unit including a laser light illumination optics and a micro display,
intermediate imaging optics configured to generate an intermediate image at an image focal plane,
a diffuser comprising a first microstructure layer formed of constituent parts, which are distributed within the first microstructure layer, and
a projection lens with an object focal plane,
wherein the diffuser is located in the image focal plane and in the object focal plane, and
wherein the laser light illumination optics and the intermediate imaging optics are optically designed for a higher F-number than an F-number of the projection lens.

26. Method for manufacturing a laser projection device according to claim 25, wherein the diffuser comprises a second microstructure layer formed of constituent parts, wherein the distance between the first and the second layer is equal to the focal length of the constituent parts.

27. Method for manufacturing a laser projection device according to claim 25, wherein the diffuser is formed by combining two substrates each with one microstructure layer by filling high refractive index resin in a gap between the two substrates.

28. Method for manufacturing a laser projection device according to claim 25, wherein the constituent parts are
convex,
shaped hexagonally within the microstructure layer,
sized within the microstructure layer smaller than a magnified pixel size of the micro display, wherein a magnification factor of the magnified pixel size is determined by the magnification of the intermediate imaging optics, and
sized in a direction perpendicular to the microstructure layer small compared to the depth of focus of the intermediate imaging optics.

* * * * *